United States Patent
Song et al.

(10) Patent No.: US 9,536,311 B2
(45) Date of Patent: Jan. 3, 2017

(54) SYSTEM AND METHOD FOR COMPONENT DETECTION

(71) Applicant: General Electric Company, Schenectady, NY (US)

(72) Inventors: Guiju Song, Niskayuna, NY (US); Charles Burton Theurer, Alplaus, NY (US); Tai-Peng Tian, Niskayuna, NY (US); Balajee Kannan, Niskayuna, NY (US); Arpit Jain, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/500,352

(22) Filed: Sep. 29, 2014

(65) Prior Publication Data

US 2016/0093054 A1 Mar. 31, 2016

(51) Int. Cl.
*G06K 9/00* (2006.01)
*G06T 7/00* (2006.01)

(52) U.S. Cl.
CPC ... *G06T 7/0044* (2013.01); *G06T 2207/30164* (2013.01); *G06T 2207/30236* (2013.01)

(58) Field of Classification Search
CPC ........ G06T 7/0044; G06T 7/60; G06T 7/0067; G06T 2207/30252; G06T 2207/10028; G06T 2207/10016
USPC .. 382/106, 104, 154, 195, 225, 141; 73/636; 348/148, 158, 241, 222; 250/559.29, 559.38; 703/1
See application file for complete search history.

(56) References Cited

U.S. PATENT DOCUMENTS

| | | | | |
|---|---|---|---|---|
| 5,596,203 A * | 1/1997 | Zingarelli | .................. | B61F 5/50 250/559.29 |
| 7,583,372 B2 * | 9/2009 | Shylanski | .......... | G01B 11/2755 356/139.09 |
| 8,290,305 B2 * | 10/2012 | Minear | .................. | G06T 7/0026 345/629 |
| 8,363,979 B2 * | 1/2013 | Abraham | .................. | 356/139.09 |

(Continued)

FOREIGN PATENT DOCUMENTS

| | | | |
|---|---|---|---|
| EP | 1600351 A1 | 11/2005 | |
| EP | 2546120 A1 | 1/2013 | |
| FR | EP 2546120 A1 * | 1/2013 | ............... B61K 9/00 |

OTHER PUBLICATIONS

B.W. Schlake; S. Todorovic; J.R. Edwards; J.M. Hart; N. Ahuja; C.P.L. Barkan; Machine Vision Condition Monitoring of Heavy-Axle Load Railcar Structural Underframe Components; Sep. 1, 2010; vol. 224; No. 5 (499-511).

(Continued)

*Primary Examiner* — Sheela C Chawan
(74) *Attorney, Agent, or Firm* — John P. Darling

(57) ABSTRACT

A method and system that include an imaging device configured to capture image data of the vehicle. The vehicle includes one or more components of interest. The method and system include a memory device configured to store an image detection algorithm based on one or more image templates corresponding to the one or more components of interest. The method and system also includes an image processing unit operably coupled to the imaging device in the memory device. The image processing unit is configured to determine one or more shapes of interest of the image data using the image detection algorithm that correspond to the one or more components of interest, and determine one or more locations of the one or more shapes of interest respective to the vehicle.

16 Claims, 6 Drawing Sheets

(56) References Cited

U.S. PATENT DOCUMENTS

| | | | |
|---|---|---|---|
| 8,724,904 B2* | 5/2014 | Fujiki | G06K 9/6284 |
| | | | 382/104 |
| 8,866,938 B2* | 10/2014 | Haas | H04N 5/361 |
| | | | 348/222.1 |
| 8,942,426 B2* | 1/2015 | Bar-Am | B61K 9/08 |
| | | | 104/242 |
| 9,098,754 B1* | 8/2015 | Stout | G06K 9/00805 |
| 9,145,140 B2* | 9/2015 | Ferguson | G05D 1/0231 |
| 2004/0263624 A1 | 12/2004 | Nejikovsky et al. | |
| 2009/0055043 A1 | 2/2009 | Mian et al. | |
| 2012/0192756 A1 | 8/2012 | Miller et al. | |
| 2012/0263342 A1 | 10/2012 | Haas et al. | |
| 2012/0279308 A1* | 11/2012 | Yan | 73/636 |
| 2014/0067188 A1 | 3/2014 | Mian | |
| 2014/0069193 A1* | 3/2014 | Graham | G01N 29/04 |
| | | | 73/584 |
| 2014/0156123 A1* | 6/2014 | Cooper | B61K 9/08 |
| | | | 701/19 |

OTHER PUBLICATIONS

Alejandro Garcia Lorente; David Fernandez Lima; Miguel Gavilan Velasco; Jose Antonio Ramos Garcia; Fernando Sanchez Dominguez; Range-based rail gauge and rail fasteners detection using high-resolution 2D/3D images, Jan. 12, 2014-Jan. 16, 2014.
Trinh, H.; IBM T. J. Watson Res. "Enhanced rail component detection and consolidation for rail track inspection".

* cited by examiner

SYSTEM AND METHOD FOR COMPONENT DETECTION

BACKGROUND

A transportation network for vehicle systems can include several interconnected main routes on which separate vehicles travel between locations to deliver or receive payloads. The transportation network may include one or more vehicle yards or route hubs, such as a rail yard or a distribution warehouse that includes a relatively dense grouping of routes or locations where several vehicles can congregate, deliver payloads, receive new payloads, refuel, or the like.

While in the vehicle yard, various components of one or more vehicles may be inspected and/or receive maintenance, such as, components of the braking system (e.g., brake lever, brake pad), coupling/decoupling mechanism configured to group vehicles into vehicle systems, wheels, or the like. In order to automate the inspections and/or maintenance tasks (e.g., performed by automated robots), a method and system is needed to detect and localize the intended component for the vehicle.

BRIEF DESCRIPTION

In an embodiment, a method for component identification is provided. The method includes obtaining image data of a vehicle. The image data includes three dimensional (3D) point cloud information and two dimensional (2D) imaging information of the vehicle. The method includes identifying one or more shapes of interest from the image data corresponding to one or more components of interest based on one or more image templates, and determining one or more locations of the one or more shapes of interest relative to the vehicle.

In an embodiment, a component identification system is provided. The system includes an imaging device configured to capture image data of the vehicle. The vehicle includes one or more components of interest. The system includes a memory device configured to store an image detection algorithm based on one or more image templates corresponding to the one or more components of interest. The system also includes an image processing unit operably coupled to the imaging device in the memory device. The image processing unit is configured to determine one or more shapes of interest of the image data using the image detection algorithm that correspond to the one or more components of interest, and determine one or more locations of the one or more shapes of interest respective to the vehicle.

In an embodiment, a tangible and non-transitory computer readable medium comprising one or more computer software modules configured to direct one or more processors is provided. The one or more modules are configured to direct the one or more processors to receive identification information for a vehicle. The identification information includes at least one of a manufacturer of the vehicle or a description of one or more components of interest on the vehicle. The one or more processors are further directed to select one or more image templates based on the identification information and obtain image data of a vehicle. The image data includes three dimensional (3D) point cloud information and two dimensional (2D) imaging information of the vehicle. The one or more processors are further directed to identify one or more shapes of interest from the image data based on the one or more image templates, and determine one or more locations of the one or more shapes of interest relative to the vehicle.

DETAILED DESCRIPTION

Figure 1:
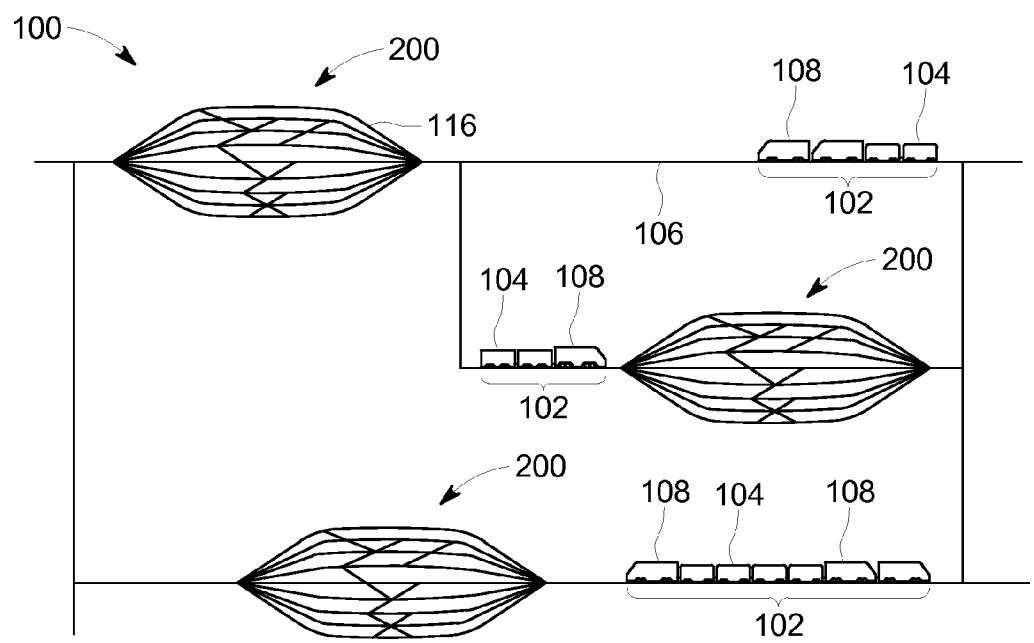
FIG. 1 is an illustrative diagram of a transportation network of an embodiment.

Various embodiments will be better understood when read in conjunction with the appended drawings. To the extent that the figures illustrate functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide methods and systems for component detection, localization, and classification based on acquired image, video and point cloud data of one or more vehicles using multidimensional data analytics. The identification of the component may be performed using one or more cameras or other visual detection devices in conjunction with recognition analytic algorithms.

At least one technical effect of various embodiments include providing information such as component type, shape, dimensions, material and orientation for automated machines (e.g. robots) to manipulate in to fill corresponding inspection and/or maintenance operations, for example, brake bleeding, train coupling/decoupling, train classification, or the like. At least one technical effect of various embodiments include more accurate object detection.

While the discussion and figures included herein may be interpreted as focusing on rail yards as vehicle yards and rail vehicle consists (e.g., trains) as the vehicle systems, it should be noted that not all embodiments of the subject matter herein described and claimed herein are limited to rail yards, trains, and railroad tracks. (A consist is a group of vehicles that are mechanically linked to travel together.) The inventive subject matter may apply to other vehicles, such as airplanes, ships, or automobiles or the like. For example, one or more embodiments may identify components to be inspected and/or receive maintenance on an airplane, a truck, or the like.

FIG. 1 is a schematic diagram of an embodiment of a transportation network 100. The transportation network 100 includes a plurality of interconnected routes 106, such as railroad tracks, roads, ship lanes, or other paths across which a vehicle system 102 travels. The routes 106 may be referred to as main line routes when the routes 106 provide paths for the vehicle systems 102 to travel along in order to travel between a starting location and a destination location (and/or to one or more intermediate locations between the starting location and the destination location). The transportation network 100 may extend over a relatively large area, such as hundreds of square miles or kilometers of area. Different transportation networks 100 may be defined by different geographic boundaries, such as different towns, cities, counties, states, groups of states, countries, continents, or the like. The number of routes 106 shown in FIG. 1 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel, such as flights paths taken by airplanes, roads or highways traveled by automobiles, water-borne shipping paths (e.g., shipping lanes) taken by ships, or the like.

Several vehicle systems 102 travel along the routes 106 within the transportation network 100. The vehicle systems 102 may concurrently travel in the transportation network 100 along the same or different routes 106. Travel of one or more vehicle systems 102 may be constrained to travel within the transportation network 100. Alternatively, one or more of the vehicle systems 102 may enter the transportation network 100 from another transportation network or leave the transportation network 100 to travel into another transportation network. In the illustrated embodiment, the vehicle systems 102 are shown and described herein as rail vehicles or rail vehicle consists. However, one or more other embodiments may relate to vehicles other than rail vehicles or rail vehicle consists. For example, the vehicle systems may represent other off-highway vehicles (e.g., vehicles that are not designed or permitted to travel on public roadways), marine vessels, airplanes, automobiles, and the like. While three vehicle systems 102 are shown in FIG. 1, alternatively, a different number of vehicle systems 102 may be concurrently traveling in the transportation network 100 (e.g., more than three, less than three).

Each vehicle system 102 may include one or more propulsion generating vehicles (PGV) 108 (e.g., locomotives or other vehicles capable of self-propulsion) and/or one or more cargo carrying vehicles (CCV) 104. The CCV 104 is a non-propulsion-generating vehicle, such as cargo cars, passenger cars, or other vehicles incapable of self-propulsion. The PGV 108 and the CCV 104 are mechanically coupled or linked together forming a vehicle system 102 (e.g., a consist) to travel or move along the routes 106. The routes 106 are interconnected to permit the vehicle systems 102 to travel over various combinations of the routes 106 to move from a starting location to a destination location and/or an intermediate location there between.

Figure 2:
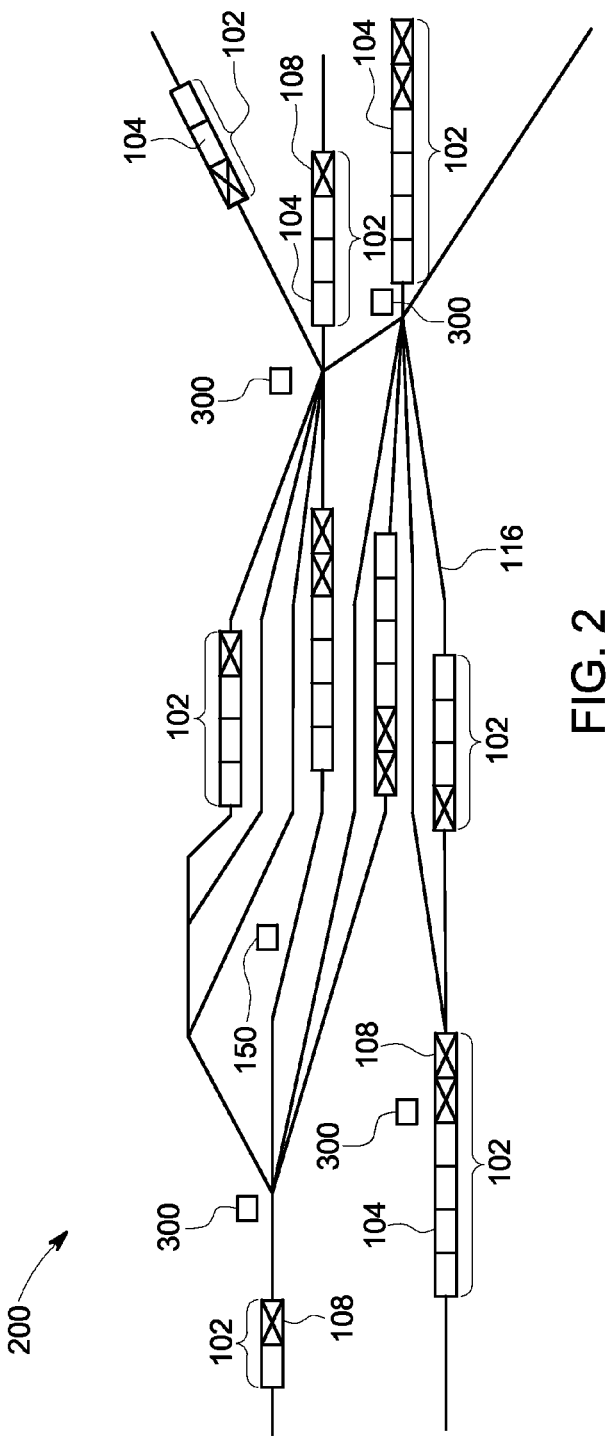
FIG. 2 is an illustrative diagram of a vehicle yard in accordance with an embodiment.

The transportation network 100 includes one or more vehicle yards 200. While three vehicle yards 200 are shown, alternatively, the transportation network 100 may include a different number of vehicle yards 200. FIG. 2 is an illustrative diagram of the vehicle yard 200 of the transportation network 100 having a control system 150 in accordance with an embodiment. The vehicle yard 200 is shown with a plurality of interconnected routes 116 that are located relatively close to each other. For example, the routes 116 in the vehicle yard 200 may be closer together (e.g., less than 10, 20, or 30 feet or meters between nearby routes 116) than the routes 106 outside of the vehicle yards 200 (e.g., more than several miles or kilometers between nearby routes 106). The number of interconnected routes 116 shown in FIG. 2 is meant to be illustrative and not limiting on embodiments of the described subject matter.

The vehicle yards 200 are located along the routes 106 in order to provide services to the vehicle systems 102, such as to inspect, repair or maintain the one or more PGV 108 (illustrated as a rectangle with an X in FIG. 2) and CCV 104 (illustrates as a rectangle in FIG. 2) of one or more vehicle systems 102, re-order the sequence of vehicle systems 102 traveling along the routes 106 by adjusting an order to which the vehicle systems 102 exits the vehicle yard 200 relative to the order of the vehicle systems 102 entering vehicle yard 200, partitioning and storing the one or more PGV 108 and/or CCV 104 of the vehicle system 102, load or couple additional CCV 104 and/or PGV 108 onto the vehicle system 102, or the like. In an embodiment, the vehicle yards 200 are not used as routes to travel from a starting location to a destination location. For example, the vehicle yards 200 may not be main line routes along which the vehicle systems 102 travel from a starting location to a destination location. Instead, the vehicle yards 200 may be connected with the routes 106 to allow the vehicle systems 102 to get off of the main line routes 106 for services described above.

The services and operations of the vehicle yard 200 may be controlled by the control system 150. The control system 150 (e.g., dispatch facility) may include various systems that perform operations within the vehicle yard 200. For example, the control system 150 may schedule inspections and/or maintenance tasks to automated machines within the vehicle yard 200. Additionally or alternatively, the control system 150 may instruct one or more component identification systems 300 to acquire or capture image data of one or more vehicles (e.g., PGV 108, CCV 104) of the vehicle systems 102 entering the vehicle yard 200. In at least one embodiment, the control system 150 may instruct the component identification system 300 to identify on one or more components of interest based on the service operations performed on the one or more vehicles (e.g., PGV 108, CCV 104) of the vehicle system 102.

Figure 3:
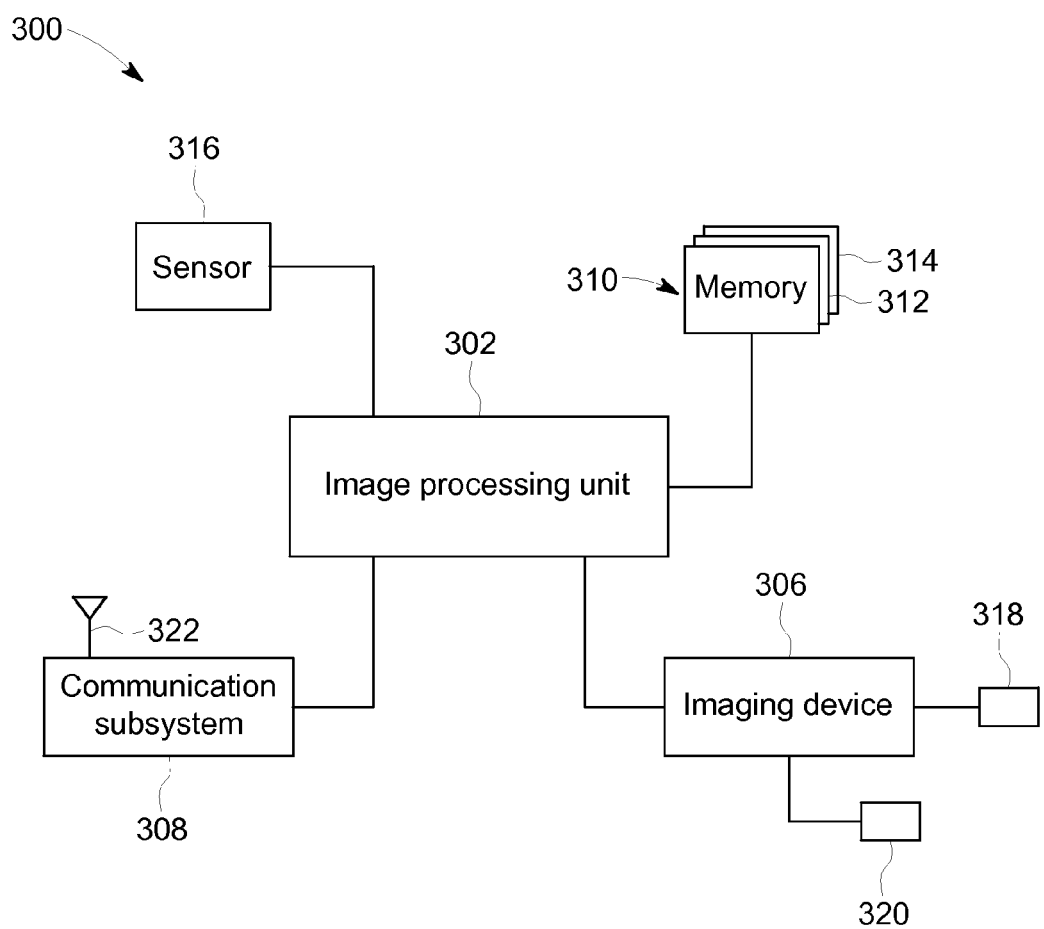
FIG. 3 is a schematic diagram of a component identification system, in accordance with an embodiment.

FIG. 3 is a schematic diagram of the component identification system 300, in accordance with an embodiment. Generally, as used herein, the component identification system 300 may be understood as a non-manned device configured to detect, localize, and classify a component of interest from image data of one or more vehicles (e.g., PGV 108, CCV 104). For example, the component identification system 300 may be used to detect, localize, and classify rail breaks on one or more vehicles (e.g., PGV 108, CCV 104) of the vehicle system 102 entering the vehicle yard 200. As another example, the component identification system 300 may be used to detect, localize, and classify a brake lever, switches, coupling/decoupling mechanisms, or other mechanical features of one or more vehicles (e.g., PGV 108, CCV 104) of the vehicle system 102. It should be noted, that while the example embodiments discussed herein are discussed in connection with real yard applications other environments may also be contemplated in alternative embodiments. For example, the component identification system 300 may be used to identify one or more components of interest for trucks, ships, airplanes, or the like.

The depicted component identification system 300 includes an image processing unit 302, an imaging device 306, memory 310, and the communication subsystem 308. The depicted component identification system 300 includes a communication subsystem 308. The communication subsystem 308 may include electronic circuitry and other hardware that communicates data signals between the component identification system 300 and a remote location (e.g., the control system 150, an automated machine). The communication system 308 may include one or more antennas 322 for wirelessly communicating with the control system 150, one or more vehicles (e.g., PGV 108, CCV 104), and/or the vehicle system 102. For example, the communication subsystem 308 may transmit location and/or component classification information (e.g., shape, dimensions, material, orientation) of the one or more components of interest detected by the component identification system 300. In another example, the communication subsystem 308 may receive information regarding the one or more components of interest from the control system 150. In another example, the communication subsystem 308 may receive identification information (e.g., manufacturer, scheduling information, age, component information), such as from radio frequency identification (RFID) tags found on the vehicle (e.g., PGV 108, CCV 104). Additionally or alternatively, the communication subsystem 308 may be coupled with conductive communication pathways, such as one or more cables, busses, wires, rails, or the like, through which the information can be communicated with, for example, the control system 150, one or more vehicles (e.g., PGV 108, CCV 104), and/or the vehicle system 102.

Generally, the imaging device 306 is configured to capture image data of one or more vehicles (e.g., PGV 108, CCV 104) that include one or more components of interest using one or more image acquisition components 318 and 320 (e.g., a camera). The image data may include 3D point cloud information, 3D images (e.g., RGBD), 2D images, video, or the like. In at least one embodiment, the imaging device 306 may include a pair of image acquisition components 318 and 320, which capture image data that can be used to create a stereo image that includes an image with a 3D set of coordinates (e.g., RGBD). Optionally, the imaging device 306 may include other visual detection devices, such as, LIDAR.

Figure 4:
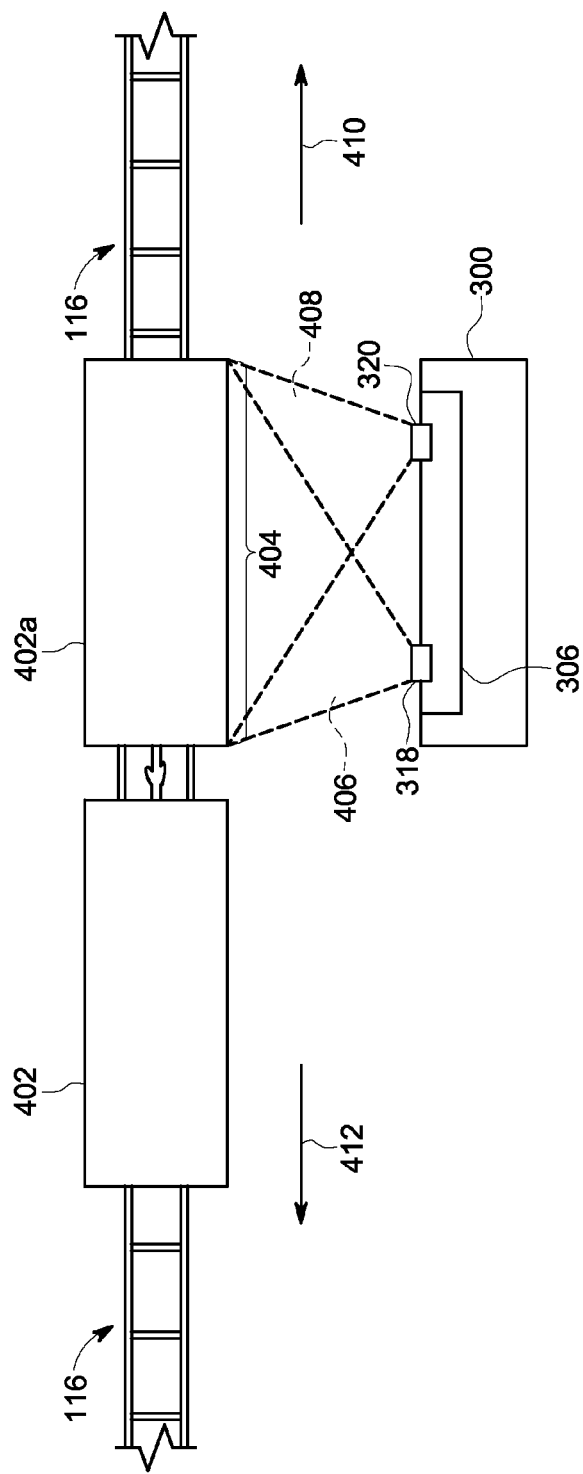
FIG. 4 is a peripheral view of a component identification system 300 and a vehicle within in a vehicle yard.

The imaging device 306 may capture the image data when the vehicle (e.g., PGV 108, CCV 104) 402 enters a field of view 404 of the imaging device 306. FIG. 4 illustrates a peripheral view of the component identification system 300 and vehicles 402 within a vehicle yard (e.g., the vehicle 200). The field of view 404 may be created from an overlay of field of views 406 and 408 of the acquisition components 318 and 320. The vehicle 402a is within the field of view 404 of the imaging device 306. While the vehicle 402a is within the field of view 404, the captured image data will correspond to or represent the portion of the vehicle 402a within the field of view 404. It should be noted, that the size of the field of view 404 may be smaller than or greater than the size shown in FIG. 4. For example, the field of view 404 may be greater than the vehicle 402a. In another example, the field of view 404 may be smaller than the vehicle 402a. Optionally, the component identification system 300 may include one or more sensors 316. The sensors 316 may be configured to detect the presence of one or more vehicles within the field of view 404 of the imaging device 306.

The image processing unit 302 of the illustrated embodiment is operably coupled to the imaging device 306 and the memory device 310. The image processing unit 302 is configured to determine from the image data one or more shapes of interest and a location of the one or more shapes of interest, using an image detection algorithm that correspond to one or more components of interest. The image detection algorithm may be stored on the memory device 310 and executed by the image processing unit 302. The memory device 310 may be a tangible and non-transitory (e.g., not a transient signal) computer readable storage. The memory device 310 may include one or more computer hard drives, flash drives, RAM, ROM, EEPROM, or the like.

The image detection algorithm may be based on an object detection algorithm, for example, a Viola-Jones object detection framework, that is configured and/or trained to localize and detect one or more components of interest from image data. The image detection algorithm may be based or trained using one or more image templates, stored on an image template database 312, corresponding to the one or more components of interest stored on the memory 310. The image template database 312 may include various images of components found on one or more vehicles (e.g., the vehicle 402, PGV 108, CCV 104) on the vehicle system 102, such as wireframe computer-aided design (CAD) models, 3D CAD models, 2D drawings, video, 3D images, 2D images, or the like. The image template database 312 may include image data of a plurality components from different manufacturers, at different angles, different shapes, different compositions, different materials, different locations relative to the vehicle, or the like. Additionally or alternatively, the image template database 312 may include image templates that are components of interest and image templates that are not components of interest.

For example, the component identification system 300 may receive instructions to identify rail brakes (e.g., components of interest) for a vehicle 402 from a remote location via the communication subsystem 308. The image processing unit 302 may select a subset of the image templates from the image template database 310 that correspond to rail brakes. The image processing unit 302 may train the image detection algorithm by using the subset of image templates.

Optionally, the image processing unit 302 may use an Adaptive Boosting or AdaBoost learning algorithm. The training of the image detection algorithm may construct one or more classifiers 314 or detectors, for example, based on Haar feature values determined from the subset of image templates. Additionally or alternatively, the one or more classifiers 314 may be based on Histogram of Oriented Gradients (HOG), Local Binary Patterns (LBP), or the like. Optionally, a plurality of classifiers 314 may be arranged in a cascade arrangement such that the image detection algorithm uses a series of successive classifiers each pertaining to features of the subset of image templates. Based on the cascade arrangement, the image processing unit 302 may locate the rail brakes within bounding boxes corresponding to locations of the one or more components of interest. Additionally or alternatively, the image processing unit 302 may train the image detection algorithm by using the remaining image templates to teach components which are not rail brakes (e.g., components of interest).

In at least one embodiment, the component identification system 300 may receive one or more of the image templates corresponding to the one or more components from a remote location. For example, the control system 150 may transmit the image templates corresponding to the one or more components to the component identification system 300. Once received, the image processing unit 302 may train the image detection algorithm based on the received image templates.

Optionally, the image templates may be selected based on RFID information (e.g., manufacturer, scheduling information, age, component information) received from the vehicle (e.g., the vehicle 402, the PGV 108, the CCV 104). For example, the image identification component 300 may receive RFID information from an RFID tag on the vehicle 402. The RFID information may include components information for the vehicle 402, a manufacturer and age of the vehicle 402. The image processing unit 302 may select a subset of the image template that corresponds to components of interest that can be installed on a vehicle matching at least a portion of the RFID information, such as, manufacturer and age. Additionally or alternatively, the RFID information may include destination information, arrival information, maintenance information (e.g., last serviced component, service schedule), or the like. The components information may include manufacturer information, characteristic information (e.g., color, dimensions, shape) corresponding to one or more components (e.g., brake lever, wheel, brake pads, brakes, coupling mechanism, or the like).

Additionally or alternatively, the image detection algorithm may be predetermined and trained with the plurality of classifiers 314 categorized based on the component of interest, predetermined vehicle information (e.g., RFID information) with corresponding components, or the like. The image processing unit 302 may select usable classifiers based on received components of interest and/or vehicle information to adjust the image detection algorithm, such that the memory 310 may not include the image template database 312 to train the image detection algorithm. For example, the classifiers 314 are categorized based on components of interest with corresponding vehicle manufacturer information. The component identification system 300 receives the component of interest and RFID information from the vehicle 402, which includes the manufacturer information for the vehicle 402. Based on the manufacturer information, the image processing unit 302 may adjust the image detection algorithm to use classifiers 314 matching the received component and RFID information.

Additionally or alternatively, the component identification system 300 may include a navigational system (not shown). The navigation system may be configured to provide mobility to the component identification system 300, for example to move the component identification system 300 about an area within which the component identification system 300 may perform one or more tasks (e.g., position one or more vehicles within the field of view of the imaging device 306). The navigation system, for example, may include one or more motors and/or wheels for propulsion, a steering mechanism, brakes, or the like. The navigation system may receive control signals or commands from the image processing unit 302 and/or a remote location (e.g., the control system 150) to control propulsion (e.g., slowing down or speeding up), braking (e.g., slowing down or stopping), and steering of the component identification system 300.

Figure 5:
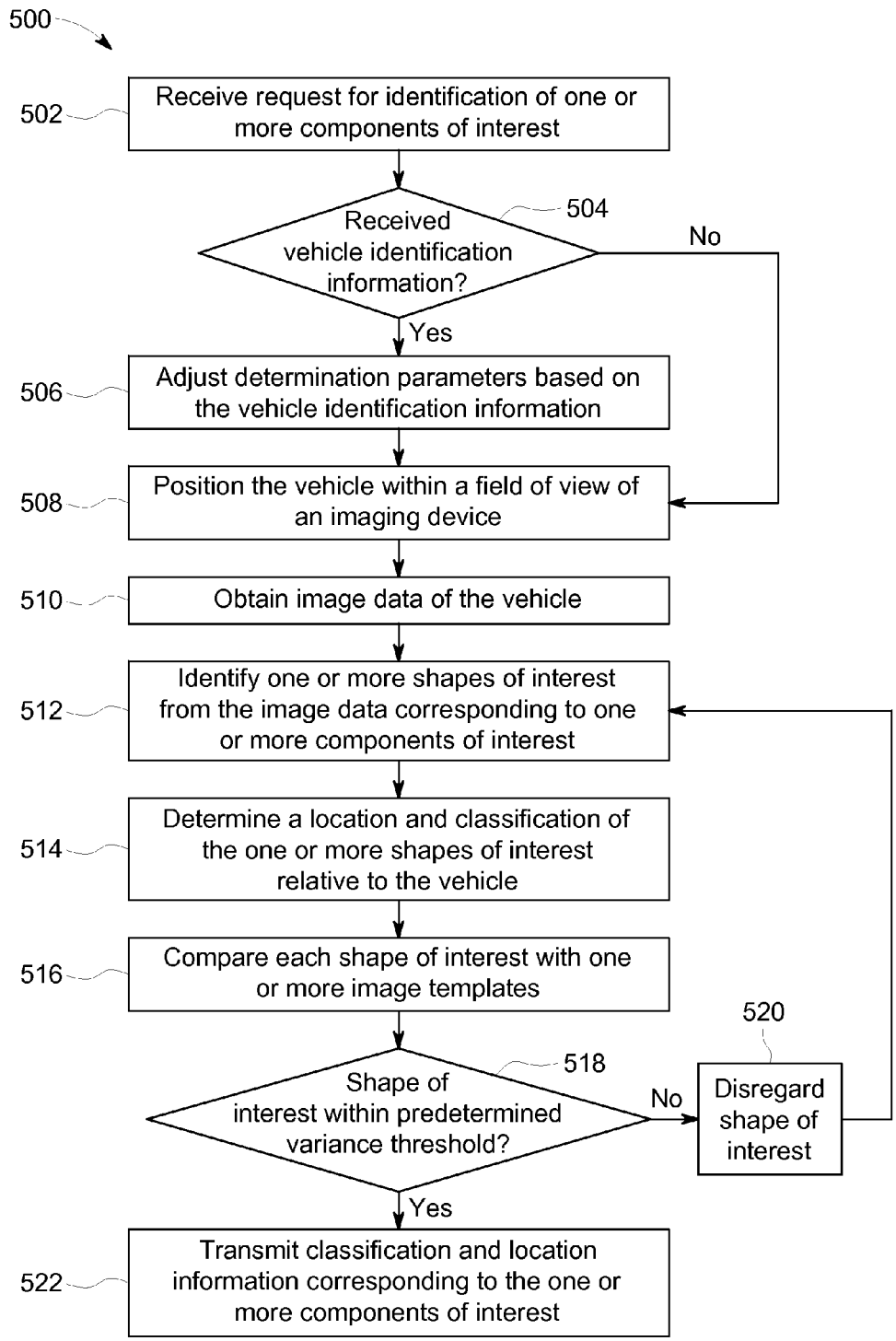
FIG. 5 is a flowchart of a method for component identification, in accordance with an embodiment.

FIG. 5 illustrates a flowchart of a method 500 for component identification. The method 500, for example, may employ structures or aspects of various embodiments (e.g., systems and/or methods) discussed herein (e.g., the component identification system 300 in FIG. 3). In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 500 may be used as one or more algorithms to direct hardware to perform one or more operations described herein. It should be noted, other methods may be used, in accordance with embodiments herein.

One or more methods may (i) obtain imaging data of a vehicle, (ii) identify one or more shapes of interest from the image data corresponding to one or more components of interest, and (iii) determining one or more locations of the one or more shapes of interest relative to the vehicle.

Beginning at 502, the method 500, may receive a request for identification of one or more components of interest. For example, the component identification system 300 may receive from the control system 150 through the communication subsystem 308 instructions to identify one or more components of one or more vehicles (e.g., PGV 108, CCV 104) of an incoming vehicle system 102 into the vehicle yard 200. Optionally, one or more processors (e.g., the image processing unit 302) disposed on the component identification system 300 may train the image detection algorithm based on the identified one or more components of interest as described above.

If, at 504, vehicle identification information is received, the method may proceed to 506. If, at 504, the vehicle identification information is not receives, the method may proceed to 508. For example, the vehicle identification information (e.g., manufacturer, scheduling information, age, component information) may be received by the component identification system 300 from an RFID tag placed on one or more vehicles of the vehicle system 102. The vehicle identification information may be included in the RFID information transmitted from the RFID tag and received by the communication subsystem 308. Optionally, the component identification system 300 may receive the vehicle identification information from the control system 150.

Additionally or alternatively, the vehicle identification information may be based on identification images positioned on an outer surface of the vehicle 402a. The identification images may include a manufacturer specific logo (e.g., the logo 612 in FIG. 6), bar codes, quick response code, or the like. For example, the imaging device 306 may obtain the identification images from one of the image acquisition components 318, 320. One or more processors (e.g., the image processing unit 302) disposed on the component identification system 300 may identify the identification image by using the image detection algorithm and comparing the identification image with an identification image database on the memory 310 containing the identification images with corresponding vehicle identification information.

At 506, the method 500 may adjust determination parameters based on the received vehicle identification information. For example, the component identification system 300 receives the RFID information from the vehicle, which includes the manufacturer information for the vehicle. One or more processors (e.g., the image processing unit 302) disposed on the component identification system 300 may adjust the image detection algorithm based on the vehicle identification information from the RFID information by selecting one or more classifiers 314 of the image detection algorithm with features matching the received component of interest and RFID information.

Additionally or alternatively, the image detection algorithm may be re-trained using one or more image templates corresponding to the received vehicle identification information from the image template database 312. For example, the one or more processors disposed on the component identification system 300 may train the image detection algorithm by using the subset of image templates (e.g., using an AdaBoost learning algorithm) to construct one or more classifiers 314 from the subset of image templates.

At 508, the vehicle 402a may be positioned within the field of view 404 of the imaging device 306. For example, the component identification system 300 may be stationary on a platform. The vehicles 402 (FIG. 4) may be moving in the direction of an arrow 410 along the route 116 until a selected vehicle, the vehicle 402a, is positioned within the field of view 404. Additionally or alternatively, the vehicles 402 may be stationary, and the component identification system 300 may change position, moving in the direction of an arrow 410 or the arrow 410, with respect to the vehicles 402 using the navigation system to position a selected vehicle, the vehicle 502a) within the field of view 404. In at least one embodiment the vehicles 402 may be moving (e.g., in the direction of the arrow 410) and the component identification system 300 may be moving concurrently in different directions (e.g., in direction of the arrow 410 and an arrow 412, respectively) or in the same direction at different rates allowing the vehicle 402a to be within the field of view 404.

At 510, the method 500 obtains image data of the vehicle 402a. For example the imaging device 306 captures image data of the vehicle 402a using the image acquisition components 318 and 320. The image data may include captured video and 3D point cloud information. Optionally, one or more processors (e.g., the image processing unit 302) disposed on the component identification system 300 may construct a surface map of the vehicle 402a by stitching the captured video. It should be noted that image data for more than one vehicle may be obtained for each vehicle system 102. Optionally, one or more processors (e.g., the image processing unit 302) disposed on the component identification system 300 may index the image data on the memory 310 corresponding to each vehicle on the vehicle system 102.

At 512, the method 500 may identify one or more shapes of interest from the image data corresponding to the one or more components of interest. For example, one or more processors (e.g., the image processing unit 302) disposed on the component identification system 300 may execute the image detection algorithm stored to determine from the image data one or more shapes of interest that correspond to the one or more components of interest.

Figure 6:
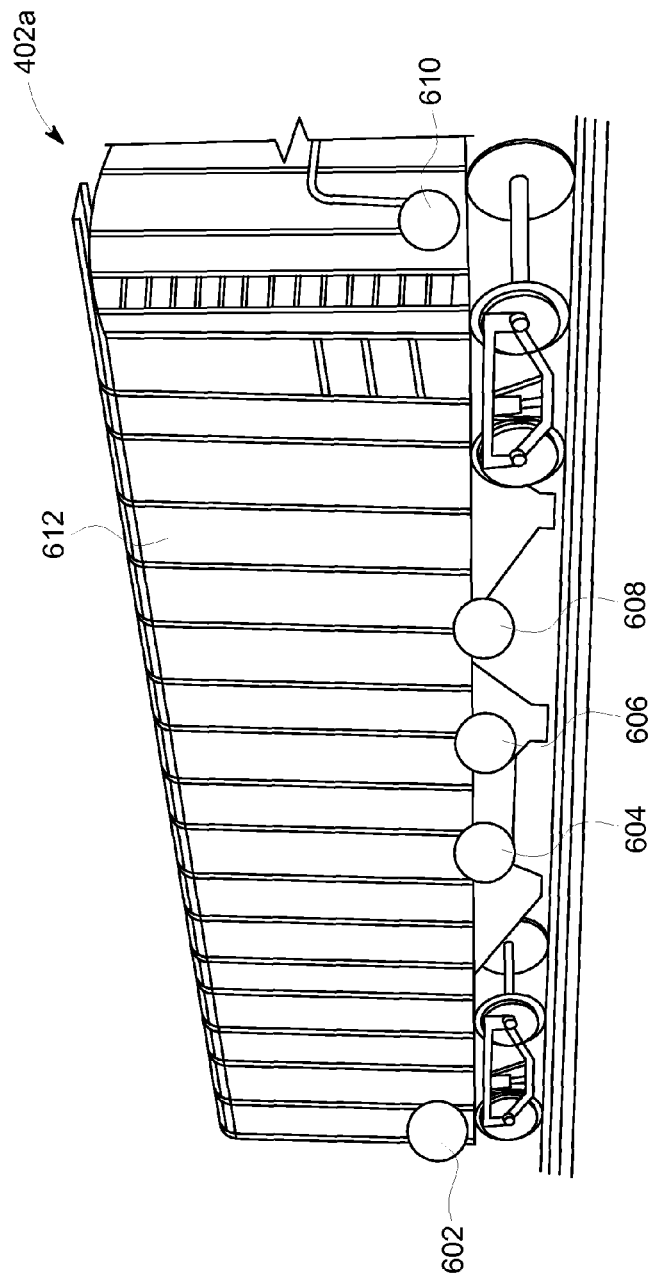
FIG. 6 is a peripheral view of a vehicle with graphical indicators corresponding to locations of shapes of interest.

At 514, the method 500 may determine a location and classification information of the one or more shapes of interest relative to the vehicle 402a. FIG. 6 is a peripheral view of the vehicle 402a with graphical indicators corresponding to locations of a shape of interest 602-610, respectively, based on the identified operation at 512. It should be noted that in other embodiments additional or alternative locations may be determined on the vehicle 402a. The location and classification information (e.g., shape, dimensions, material, orientation) may be a result of the image detection algorithm. Optionally, one or more processors (e.g., the image processing unit 302) disposed on the component identification system 300 may locate the one or more shapes of interest based on a coordinate system, such as a Cartesian coordinate system, relative to the vehicle 402a at a predetermined origin. Additionally or alternatively, the location of the one or more shaped of interest may be based on a position from the component identification system 300.

At 516, each shape of interest 602-610 may be compared with one or more image templates (e.g., from the image template database 312. For example, the shapes of interest 602-610 identified and located above may include outliers or false positives that do not correspond to the one or more components of interest. One or more processors (e.g., the image processing unit 302) disposed on the component identification system 300 may match the image data, such as a depth of the 3D point cloud data, for each shape of interest 602-610 with one or more image templates (e.g., 3D wireframe CAD model) corresponding to the one or more components of interest. The depth of the shape of interest 602-610 may be segmented by the one or more processors and grouped into image planes based on the 3D point cloud surface normal cues. Based on the image planes, the one or more processors may extract 3D line edges and match the calculated line edges with the image templates (e.g., 3D wireframe CAD model) to a predetermined variance threshold.

If, at 518, the shape of interest is within a predetermined variance threshold, the method may proceed to 522. If, at 518, the shape of interest is not within the predetermined variance threshold, the method may proceed to 520. The predetermined variance threshold may represent a percentage, ratio, or the like, that the calculated line edges may differ from the image templates. The predetermine variance threshold may be stored on the memory 310, received from a remote location (e.g., the control system 150), resulting from the training of the image detection algorithm, or the like.

At 520, the method 500 may disregard the shape of interest. For example, if the one or more processors (e.g., the image processing unit 302) determined that the calculated line edges of the shapes of interest 604 and 606 are outside the predetermined variance threshold, the shapes of interest 604 and 606 do not correspond to the one or more components of interest, and will not transmit or output the location of the shapes of interest 604 and 606. Optionally, the one or more processors disposed on the component identification system 300 may re-train the image detection algorithm on the memory 310 by updating one or more classifiers 314 with image templates based on the image data of the shapes of interest 604 and 606.

At 522, the method 500 may transmit classification and location information of the shape of interest corresponding to the one or more components of interest. For example, the one or more processors (e.g., the image processing unit 302) disposed on the component identification system 300 may transmit the classification and location information to a remote location (e.g., the control system 150) through the communication subsystem 308. Optionally, the one or more processors may transmit the classification and location information to an automated machines (e.g. robots).

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation may be particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A component identification system comprising:
   an imaging device configured to capture image data of a vehicle, wherein the vehicle includes one or more components of interest;
   an image processing unit operably coupled to the imaging device, the image processing unit configured to:
      determine one or more shapes of interest of the image data that corresponds to the one or more components of interest; and
      determine one or more locations of the one or more shapes of interest respective to the vehicle, wherein the image data includes three dimensional (3D) point cloud information and two dimensional (2D) imaging information of the vehicle;
   a memory device that includes one or more identification images corresponding to identification information positioned on an outer surface of the vehicle, wherein the determine the one or more shapes of interest operation is based on one or more image templates corresponding to the identification information; and
   a communication device configured to receive identification information from the vehicle wirelessly, the identification information includes at least one of a manufacturer of the vehicle or a description of one or more components of interest on the vehicle,
   wherein the image processing unit determines one or more shapes of interest of the image data that corresponds to the one or more components of interest with an object detection algorithm that is trained using ate least one of the one or more image templates.

2. The component identification system of claim 1, wherein the one or more image templates is based on the identification information.

3. The component identification system of claim 1, wherein the one or more image templates include at least one of shape information, location information relative to the vehicle, or dimension information of the one or more components of interest.

4. The component identification system of claim 1, wherein the image processing unit is configured to determine an orientation of the one or more shapes of interest relative to the vehicle.

5. The component identification system of claim 1, wherein the one or more components of interest is at least one of a wheel, a brake pad, a brake rod, or a coupling mechanism configured to couple the vehicle to another vehicle.

6. The component identification system of claim 1, wherein the vehicle is a part of a rail vehicle system.

7. The component identification system of claim 1, wherein the image processing unit is configured to communicate the one or more locations to a remote location.

8. The component identification system of claim 1, wherein the object detection algorithm is a Viola-Jones algorithm.

9. The component identification system of claim 1, wherein the object detection algorithm is an Adaptive Boosting or AdaBoost learning algorithm.

10. The component identification system of claim 1, wherein the object detection algorithm constructs one or more classifiers from at least one of the one or more image templates.

11. The component identification system of claim 10, wherein the classifiers are based on Haar feature values from the at least one of the one or more image templates.

12. The component identification system of claim 11, wherein the classifiers are based on Histogram of Oriented Gradients from the at least one of the one or more image templates.

13. The component identification system of claim 11, wherein the classifiers are based on Local Binary Patterns from the at least one of the one or more image templates.

14. The component identification system of claim 10, wherein the classifiers are based on Histogram of Oriented Gradients from the at least one of the one or more image templates.

15. The component identification system of claim 14, wherein the classifiers are based on Local Binary Patterns from the at least one of the one or more image templates.

16. The component identification system of claim 10 wherein the classifiers are based on Local Binary Patterns from the at least one of the one or more image templates.

* * * * *